(12) United States Patent
Bennett et al.

(10) Patent No.: US 8,239,495 B2
(45) Date of Patent: Aug. 7, 2012

(54) MEDIA PLAYER WITH INTEGRATED PARALLEL SOURCE DOWNLOAD TECHNOLOGY

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 317 days.

(21) Appl. No.: 12/638,914

(22) Filed: Dec. 15, 2009

(65) Prior Publication Data
US 2011/0106964 A1 May 5, 2011

Related U.S. Application Data (60) Provisional application No. 61/257,155, filed on Nov. 2, 2009.

(51) Int. Cl.
*G06F 13/00* (2006.01)

(52) U.S. Cl. .......................... 709/219; 709/231; 709/250

(58) Field of Classification Search .................. 709/217, 709/219, 230, 231, 250
See application file for complete search history.

(56) References Cited

U.S. PATENT DOCUMENTS

| | | | | |
|---|---|---|---|---|
| 7,346,698 B2* | 3/2008 | Hannaway | ..................... | 709/231 |
| 7,685,204 B2* | 3/2010 | Rogers | ........................... | 707/770 |
| 8,068,514 B2* | 11/2011 | Martinez et al. | ............. | 370/468 |
| 2009/0119715 A1* | 5/2009 | Schwesinger et al. | .......... | 725/58 |
| 2010/0306402 A1* | 12/2010 | Russell et al. | ................ | 709/231 |

* cited by examiner

*Primary Examiner* — Viet Vu
(74) *Attorney, Agent, or Firm* — Garlick & Markison; Holly L. Rudnick (57) ABSTRACT

A media player implements an integrated parallel source download technology to receive a media file from streamed and segmented media file sources. A first source streams delivery of streamed media packets of the media file in sequential packet number order to the media player, while a second source provides segmented delivery of segmented media packets of the media file in random order to the media player. The media player combines the streamed media packets and the segmented media packets to produce the media file.

20 Claims, 10 Drawing Sheets

MEDIA PLAYER WITH INTEGRATED PARALLEL SOURCE DOWNLOAD TECHNOLOGY

CROSS REFERENCE TO RELATED PATENTS

This application claims the benefit of priority to U.S. Provisional Patent Application having an application No. 61/257,155, filed Nov. 2, 2009, and titled "Media Player with Integrated Parallel Source Download Technology" which is incorporated herein by reference in its entirety.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention is related generally to media processing devices, and more particularly to media players for processing streamed and segmented media packets.

2. Description of Related Art

Delivery of digital multimedia data or content (e.g., audio, full-motion video, pictures, etc.) is typically performed by a content server at one network site "streaming" the multimedia content over the network to a client (media player) at another site. Streaming is a process in which packets, sent over an Internet Protocol (IP)-based network, are used to present multimedia data continuously to a recipient client as the data arrives at the client. Thus, as perceived by the user, the multimedia content is presented in substantially real-time. Therefore, with a "streaming" architecture, the client does not have to download and store a large file before displaying the multimedia data. That is, the client may begin to present the data as it arrives (i.e., just-in-time rendering), rather than waiting for the entire data set to arrive before beginning presentation. Accordingly, at the client device, received data is buffered and continuously processed as soon as, or soon after, being received by the client for real time presentation of multimedia content.

Most streaming media sessions are either live sessions or video-on-demand (VOD) sessions that are typically associated with a single stream being presented to the client. However, if there is congestion in the network or the streaming server is overloaded, there can be considerable delays in streaming the media file, resulting in a non-continuous presentation of the media file on the client device. Such interruptions in presentation can be distracting to a viewer or listener and are highly undesirable in most applications. In addition, the buffer size in some client devices may not be large enough to accommodate the requested media file, and therefore, buffering delays may occur, which also produces interruptions in the presentation of the media file on the client device.

Another type of media content delivery is peer-to-peer delivery. In a peer-to-peer architecture, a client side download manager identifies a single media file stored on a plurality of remote sources. For example, a web site can maintain a list of sources for particular media files. The download manager initiates and transmits requests to each of the plurality of remote sources for particular segments of the media file in order to retrieve and "stitch" together the entire media file from the requested and delivered segments. However, delivery in such a peer-to-peer environment is not necessarily sequential in that the client typically receives the segments out-of-order. The client must wait for all segments to be received and "stitched" together before the presentation can begin. Depending on the network congestion and the reliability of the remote sources, this delay can be considerable, especially when large blocks of multimedia data are involved. In addition, the website maintaining the list of "sources" is typically not monitored, and therefore, the information on the website may not be accurate.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

DETAILED DESCRIPTION OF THE INVENTION

Figure 1:
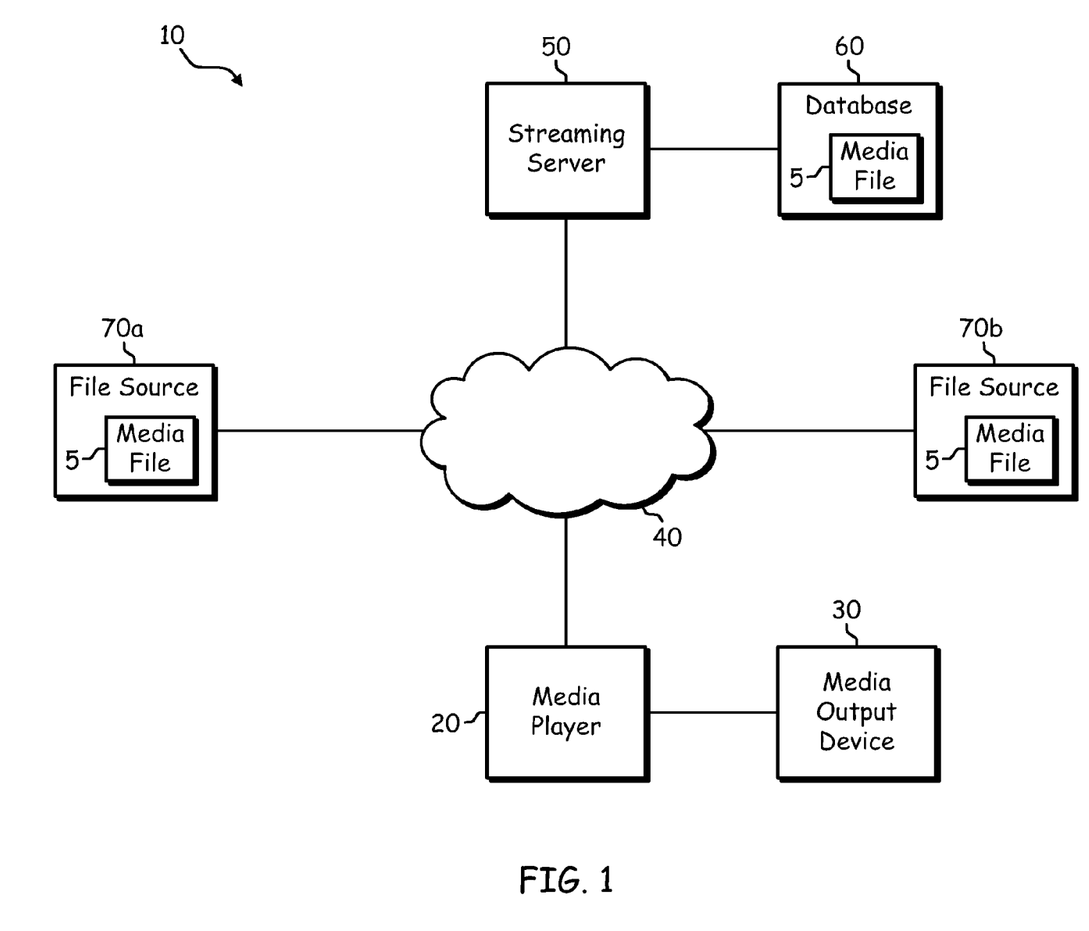
FIG. 1 is a schematic block diagram illustrating an exemplary media file download system using parallel streamed and segmented media file sources, in accordance with the present invention.

FIG. 1 is a schematic block diagram illustrating an exemplary media file download system 10 using parallel streamed and segmented media file sources, in accordance with the present invention. The system 10 includes a streaming media server 50, database 60, segmented media file sources 70a and 70b, a media player 20 and a network 40, such as an Internet Protocol (IP) network. The media player 20 is any device capable of downloading and processing a media file and providing the media file 5 to a media output device 30 communicatively coupled thereto. By way of example, but not limitation, the media player 20 can include a set top box, a digital video recorder (DVR), a personal computer, a television, a personal digital assistant (PDA), a cellular telephone or a laptop computer, while the media output device 30 can include a display device and/or a sound card/speakers.

The media file 5 can include any type of digital multimedia content, including but not limited to, a sound file, picture data file, movie file, text file or any other type of media that can be digitally stored and processed. In addition, the data forming the media file 5 may be either encoded and compressed using any coding standard, e.g., MPEG-1, MPEG-2, MPEG-2-enhanced for HD, MPEG-4 AVC, H.261, H.263 and SMPTE VC-1, uncompressed and encoded or uncompressed and not encoded.

The streaming media server 50 is coupled to the network 40 to stream the media file 5 to the media player 20 using a suitable protocol, such as the Real-Time Streaming Protocol (RTSP). The streamed media file is received at the media player as streamed media packets in sequential packet number order. The streaming media server 50 may be a broadcast or multicast media server and/or a cable head-end that provides video on demand. In addition, although the streaming media server 50 is illustrated as a single node coupled to network 40, its functionality may be distributed among a plurality of nodes depending on the underlying streaming media architecture. The database 60 serves as a depository of the media file 5. The streaming media server 50 interfaces with the database 60 to retrieve the media file 5 to be streamed to the media player 20.

The media file 5 is further stored on one or more additional media file sources 70a and 70b. By way of example, but not limitation, the media file sources 70a and 70b can be personal computers, laptop computers, DVR's, servers or other network nodes on which digital multimedia content is stored. Each of the media file sources 70a and 70b also couples to the network 40 to transmit at least a portion or segment of the media file 5 to the media player 20 using a suitable protocol, such as the Transmission Control Protocol (TCP). For example, each of the media file sources 70a and 70b can transmit the same segment of the media file 5 to the media player 20 and/or different segments of the media file 5 to the media player 20. The media file segment(s) transmitted from the media file sources 70a and 70b are received at the media player 5 as segmented media packets in random packet number order.

Network 40 is illustrative of a network infrastructure that can include, among others, any wireline, wireless, satellite, or cable network arrangement, or a combination thereof, that can support transfer of the media file 5 from the streaming media server 50 and/or the media file sources 70a and 70b to the media player 20. In one implementation, network 40 may comprise a public packet-switched network such as the Internet that is accessible via suitable access means including both narrowband (e.g., dial-up) and broadband (e.g., cable, digital subscriber line or DSL, etc.) access mechanisms. Alternatively, network 40 may be implemented as a private enterprise-level intranet. As a further alternative, network 40 may be implemented as a wireless packet data service network, such as the General Packet Radio Service (GPRS) network, that provides a packet radio access for mobile devices using the cellular infrastructure of a Global System for Mobile Communications (GSM)-based carrier network. In still further implementations, the network 40 may comprise any $3^{rd}$ Generation Partnership Project (i.e., 3GPP, 3GPP2, etc.) network operable to serve Internet Protocol (IP)-capable handheld devices using appropriate wireless infrastructure that includes, among others, short-range wireless fidelity (WiFi) access points (APs), base stations or "hot spots." It should be understood that embodiments of the present invention apply to any particular wireless or wireline network implementation of the network 40.

In an exemplary operation, a web browser executing on the media player 20 can interact with one or more web servers (not shown) to locate sources of the media file 5, e.g., by identifying a uniform resource locator (URL) and/or IP address for the streaming media server 50 and/or one or more media file sources 70a and 70b. In one embodiment, the URL and/or IP addresses for the additional media file sources 70a and 70b is obtained from the streaming media server 50. For example, in embodiments in which the streaming media server 50 is overloaded and/or the quality is poor, the streaming media server 50 can provide the URL and/or IP addresses of one or more additional media file sources 70a and 70b from which the media player 20 can obtain the media file 5. In another embodiment, the URL and/or IP addresses for the additional media file sources 70a and 70b can be obtained by the media player 20 from an internally stored list of media file sources 70a and 70b or from a website maintaining a list of media file sources 70a and 70b that are capable of transmitting the media file 5 to the media player 20.

To initiate a streaming media session, the media player 20 communicates with the streaming media server 50 via network 40, using the URL and/or IP address, to establish the streaming media session and begin receiving streaming digital multimedia content forming the media file 5 from the streaming media server 50. In addition, the media player 20 can control play back of the streaming digital multimedia content during the streaming media session. For example, the media player 20 may send RTSP requests to the streaming media server 50 to play, pause or stop a streaming media session.

In addition, the media player 20 can initiate a communication session with one or more additional segmented media file sources 70a and 70b, using the retrieved URL's and/or IP addresses, and request one or more segments of the media file 5 from the media file sources 70a and 70b. For example, the media player 20 can request a particular segment of one or more media packets of the media file 5 from media file source 70a and another segment of one or more media packets of the media file 5 from media file source 70b. The communication session with the additional media file source(s) 70a and 70b can be initiated simultaneous to the streaming media session with the streaming media server 50 or can be initiated prior to or subsequent to the streaming media session. For example, the media player 20 can establish a first IP connection with the streaming media server 50 and either simultaneously, immediately prior or immediately subsequent thereto establish a second IP connection with an additional media file source 70a. As another example, the media player 20 can establish an off-line IP connection with an additional media file source 70a to retrieve the segmented media packets and then subsequently establish a non-overlapping, real-time IP connection with the streaming media server 50 to receive the streamed media packets.

From the streamed media packets received from the streaming media server 50 and the segmented media packets received from the media file source(s) 70a and 70b, the media player 20 can re-produce the media file 5 and output the media file 5 to the media output device 30 for viewing and/or listening. In an exemplary embodiment, the media player 20 can combine the streamed media packets and the segmented media packets to produce the media file 5.

Figure 2:
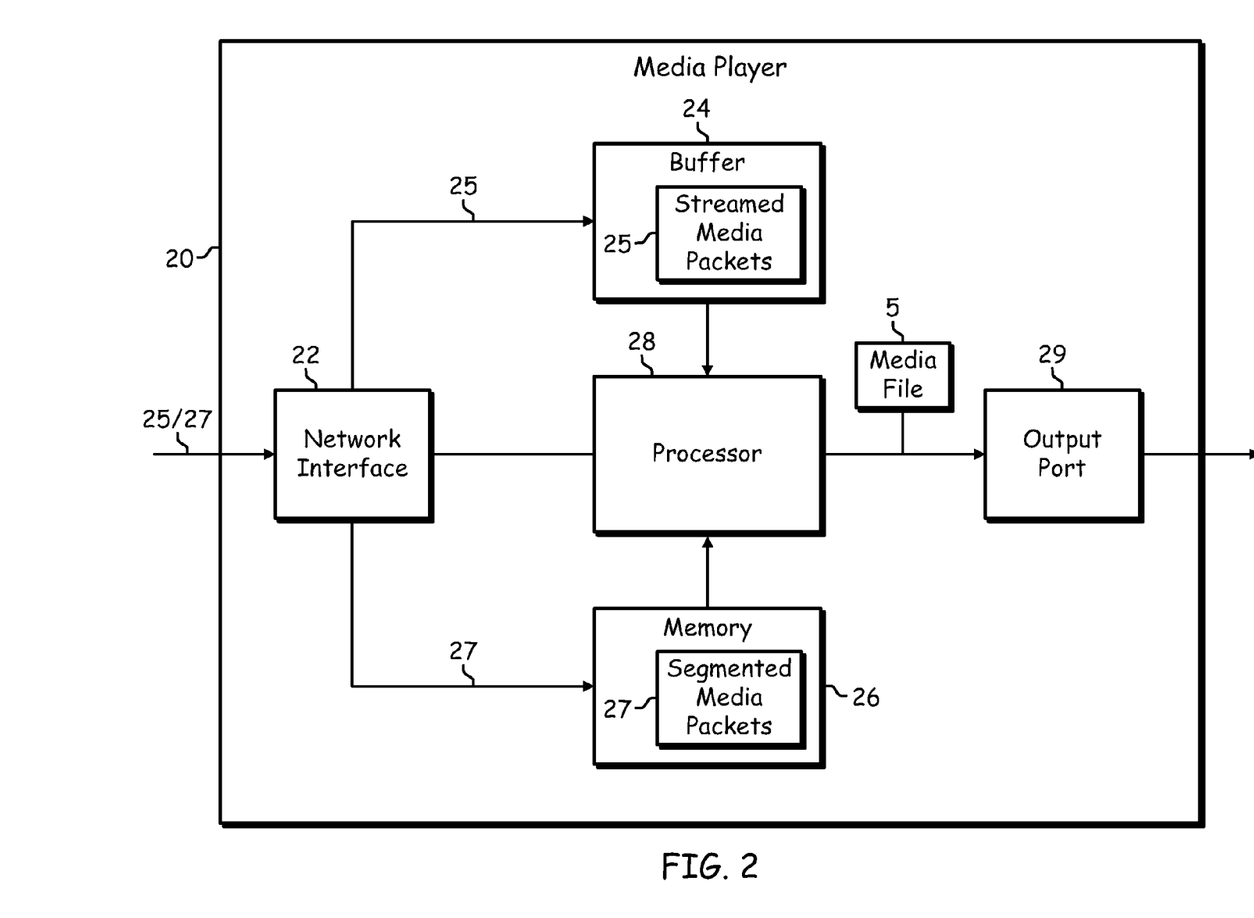
FIG. 2 is a schematic block diagram illustrating an exemplary media player for producing the media file using streamed and segmented media packets in accordance with the present invention.

FIG. 2 is a schematic block diagram illustrating an exemplary media player 20 for producing the media file using streamed and segmented media packets in accordance with the present invention. The media player 20 includes a network interface 22, a buffer 24 coupled to the network interface 22, a memory 26 coupled to the network interface 22, a processor 28 coupled to the network interface 22, the buffer 24 and the memory 26 and an output port 29 coupled to the processor 28.

The network interface 22 is further coupled to a network (shown in FIG. 1) to receive media packets of a media file 5 from a streaming source and one or more segmented sources. For example, in an exemplary embodiment, the network interface 22 is coupled to receive streamed media packets 25 from a streaming media server and segmented media packets 27 from one or more segmented media file sources, as shown in FIG. 1. The streamed media packets 25 are provided from the network interface 22 to the buffer 24 for storage therein, while the segmented media packets 27 are provided from the network interface 22 to the memory 26 for storage therein, based on instructions from the processor 28.

The processor 28 operates to request the streamed media packets from a streaming media source via network interface 22 and to request the segmented media packets from one or more media file sources via network interface 22. In addition, upon receipt of the streamed media packets 25 and segmented media packets 27, the processor operates to retrieve the streamed media packets 25 from the buffer 24 and the segmented media packets 27 from the memory 26 and process the retrieved streamed media packets 25 and retrieved segmented media packets 27 to produce the media file 5 from a combination thereof. The processor 28 further operates to output the media file 5 to one or more output media devices via output port 29. It should be understood that the output port 29 represents one or more audio/video output ports.

The processor 28 may be implemented using a shared processing device, individual processing devices, or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on operational instructions. The memory 26 may be a single memory device or a plurality of memory devices. Such a memory device may be a read-only memory, random access memory, volatile memory, non-volatile memory, static memory, dynamic memory, flash memory, and/or any device that stores digital information. Note that when the processor 28 implements one or more of its functions via analog circuitry, digital circuitry, and/or logic circuitry, the memory storing the corresponding operational instructions is embedded with the circuitry comprising analog circuitry, digital circuitry, and/or logic circuitry.

In an exemplary operation, the processor 28 executes a web browser to locate the URL and/or IP addresses of streaming and segmented media file sources via network interface 22. The processor 28 can then initiate a streaming media session to receive streamed media packets 25 via network interface 22 and can transmit one or more requests for segmented media packets 27 via network interface 22. Upon receipt of the streamed media packets 25 and the segmented media packets 27, the processor 28 can direct the streamed media packets 25 to be stored in the buffer 24 and the segmented media packets 27 to be stored in the memory 26.

Thereafter, the processor 28 can retrieve one or more streamed media packets 25 from the buffer 24 and one or more segmented media packets 27 from the memory 26 and combine the retrieved streamed media packets 25 and retrieved segmented media packets 27 to produce the media file 5. The processor 28 can then output the media file 5 for viewing and/or listening via output port 29. The particular combination of streamed media packets 25 and segmented media packets 27 used to produce the media file varies depending upon the available streamed media packets 25 in the buffer 24, the available segmented media packets 27 in the memory 26 and the desired quality of the output media file 5.

Figure 3A:
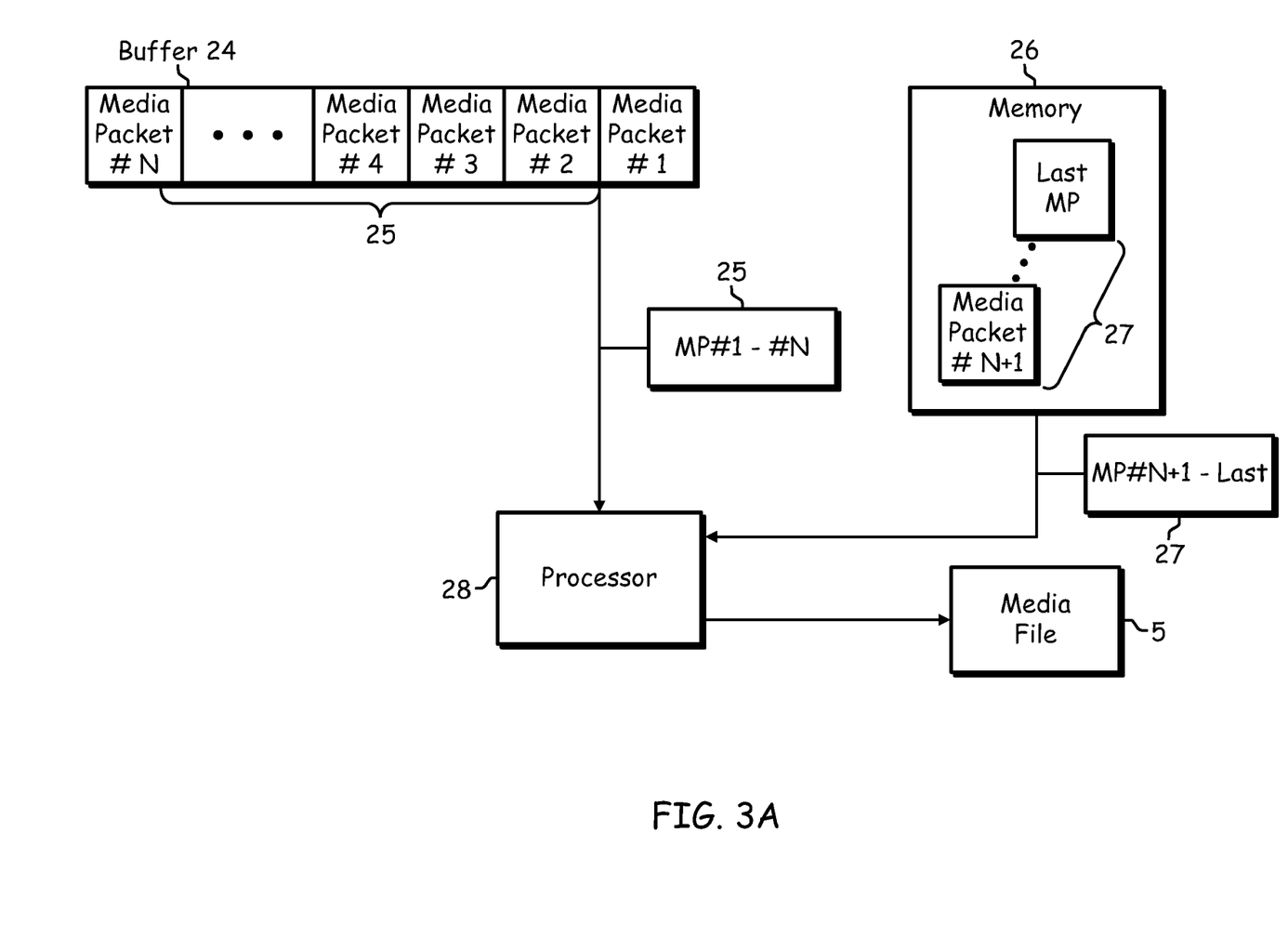
FIGS. 3A and 3B are schematic diagrams illustrating exemplary operations of the media player to produce the media file in accordance with the present invention.

For example, as shown in FIG. 3A, the processor 28 can produce the media file 5 by taking a first portion of streamed media packets 25 from the buffer 24 and a second portion of segmented media packets 27 from the memory 26. In this example, the media file 5 is broken up into two portions: a beginning portion corresponding to media packets #1-#N and an ending portion corresponding to media packets #N+1-#Last. The beginning portion also corresponds to the size of the buffer 24, i.e., media packet #N is equal to the size of the buffer 24. Thus, the beginning portion is delivered as streamed media packets 25 from a streaming media source, while the ending portion, corresponding to the media packets that fall outside of the buffer 24, is delivered as segmented media packets 27 from one or more additional media file sources.

Although the beginning portion is shown in FIG. 3A as including the entire buffer, it should be understood that in other embodiments, the beginning portion may include only a part of the buffer. For example, the processor 28 may retrieve media packets #1-#4 from the buffer 24 and retrieve the remainder the media packets (i.e., media packets #5-#Last) from the memory 26. In addition, it should be understood that the segmented media packets 27 may be combined with the streamed media packets 25 in any manner. For example, the processor 28 may retrieve media packets #1-#4 from the buffer 24, retrieve media packets #5-#10 from the memory, retrieve media packets #10-#N from the buffer 24 and the remainder the media packets (i.e., media packets #N+1-#Last) from the memory 26.

In another embodiment, the segmented media packets 27 can correspond to an initial or beginning portion of the media file 5, while the streamed media packets 25 correspond to a subsequent portion of the media file 5. For example, if the buffer 24 is not full enough to initiate playback, segmented media packets 27 can be used to start playback of the media file 5 until sufficient buffering has occurred. In yet another embodiment, if the buffer size is not sufficient to prevent playback delays, segmented media packets 27 can be used to fill in the gaps between buffer enqueuing.

In yet another embodiment, the number of segmented media packets 27 requested by the processor 28 from the additional segmented media file sources depends not only on the size of the buffer, but also the expected delay in receiving the segmented media packets. For example, if the expected delay in receiving segmented media packets exceeds the dequeue time of the buffer, the processor 28 may continue to buffer streamed media packets after the initial dequeue of the entire buffer and request the segmented media packets that fall outside of a subsequent buffer dequeue time.

In other embodiments, the processor 28 may assign different priorities to different portions of segmented media packets 27. For example, the processor 28 may assign a higher priority to a portion of segmented media packets that falls immediately outside of the buffer and lower priorities to other portions of segmented media packets. In addition, the priorities can be redistributed over time as the media is consumed and the buffer 24 contents change. For example, the priorities can be assigned based on the current playback position in the buffer 24. In an exemplary embodiment, the assigned priorities can be used by the processor 28 to determine which media file sources to request the segmented media packets from. For example, a portion with a higher priority can be requested from the highest performing media file source(s). In another exemplary embodiment, the assigned priorities can also be sent to the media file sources for use in assigning a quality of service to the transmitted segmented media packets. For example, a different QoS can be assigned to each priority.

Figure 3B:
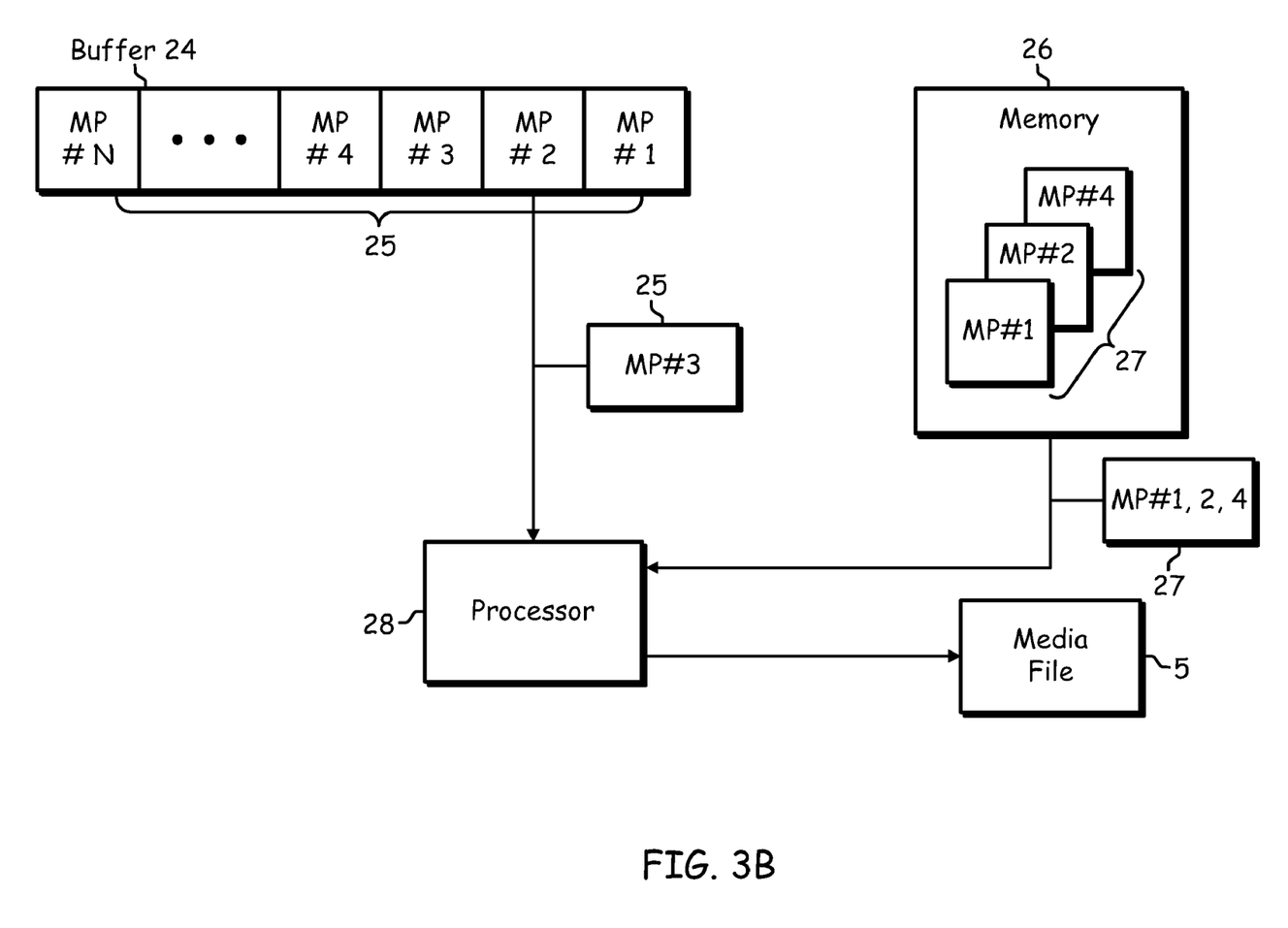

Turning now to FIG. 3B, the processor 28 may use the streamed media packets 25 stored in the buffer 24 to fill in gaps in the segmented media packets 27. For example, as shown in FIG. 3B, media packet #3 is missing from the segmented media packets 27 stored in the memory 26. Therefore, the processor 28 can retrieve media packets #1, #2 and #4 from the memory 26 and missing media packet #3 from the buffer 24 to produce the media file 5. Similarly, the processor 28 may use the segmented media packets 27 stored in the memory 26 to fill in gaps in the streamed media packets 25 stored in the buffer 24. For example, if the processor 28 determines that media packet #3 was not received correctly, the processor 28 can access the memory 26 to retrieve media packet #3.

Figure 4A:
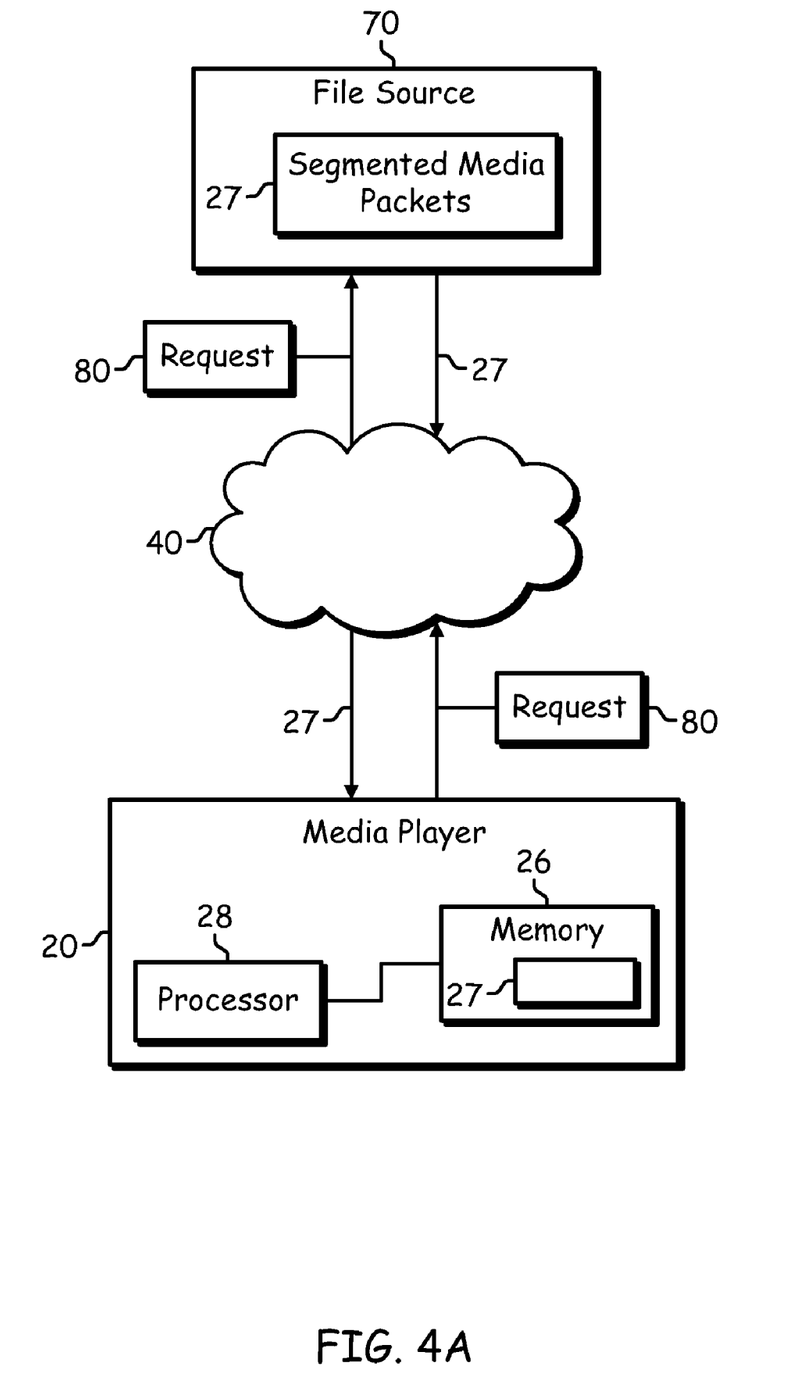
FIGS. 4A-4D are schematic block diagrams illustrating exemplary operations of the media player to request segmented media packets in accordance with the present invention.

FIGS. 4A-4D are schematic block diagrams illustrating exemplary operations of the media player 20 to request segmented media packets 27 from various media file sources 70 in accordance with the present invention. As can be seen in FIG. 4A, the media player 20 generates a request 80 for segmented media packets from a particular media file source 70 and transmits the request to the media file source 70 via network 40 using a URL and/or IP address for the media file source 70. The request 80 can be a request for the entire media file (i.e., all media packets) or a request for a portion or portions of the media file (i.e., a list or grouping of media packets). For example, the request 80 can indicate that the media player 20 would like to receive media packets starting at a first offset time from the beginning of the media file 5 and ending at a second offset time from the beginning of the media file 5. In addition, the media player 20 can generate and transmit multiple requests 80 to the media file source 70, each for a different segment of the media file 5. These requests can be generated in order or out of order (i.e., the media player 20 can request media packets #10-#15 and then subsequently send a request for media packets #5-#9).

The media file source 70 transmits the requested segmented media packets 27 to the media player via network 40. The received segmented media packets 27 are stored in memory 26 by processor 28. The received segmented media packets 27 may be received in any order. For example, in an exemplary operation, if the media player 20 requested media packets #5-#10 from the media file source 70, the requested media packets may be transmitted and/or received out of order (i.e., media packet #6 may be received before media packet #5). In another embodiment, the media player 20 may request that the segmented media packets be received in order (i.e., sequential transmission and reception).

Figure 4B:
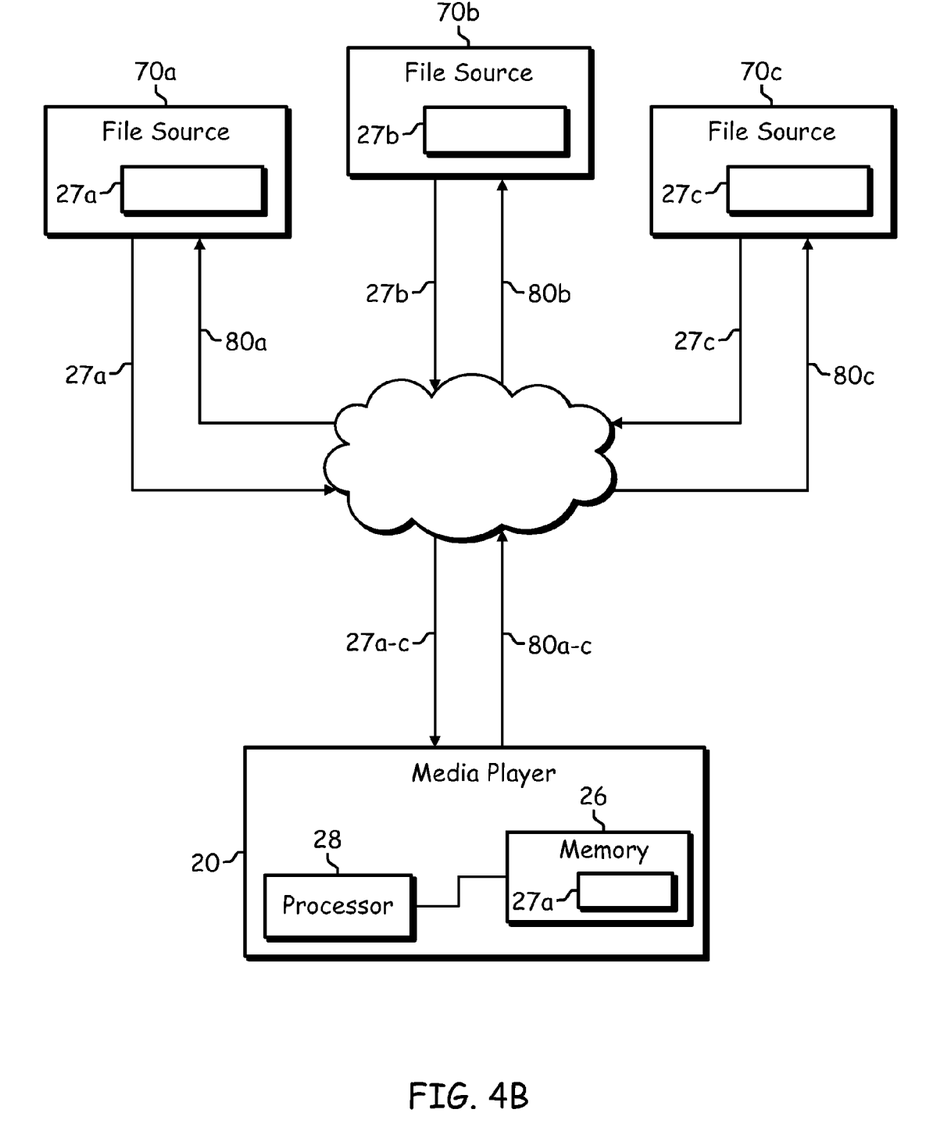

FIG. 4B illustrates a media player 20 generating multiple requests 80a-80c to multiple media file sources 70a-70c, respectively, for the media file 5. The media player 20 can select the media file sources 70a-70c to receive the request based on a number of different factors, including but not limited to, the current upload/download traffic, firewalls and/or the past performance of the media file sources (i.e., the media player 20 can select the media file sources that have had the highest quality of service and/or the fastest average delivery time).

In FIG. 4B, each request 80a-80c is for the same segment of the media file 5. However, in other embodiments, each request 80a-80c can be for a different segment of the media file 5. In addition, in FIG. 4B, all requests 80a-80c are generated simultaneously. However, in other embodiments, the requests 80a-80c can be generated sequentially.

Each of the media file sources 70a-70c receives their respective request 80a-80c via network 40, processes their respective request 80a-80c and transmits the requested segmented media packets 27a-27c associated with their respective request 80a-80c back to the media player 20 via network 40. Upon receiving the requested segmented media packets 27a-27c, the processor 28 processes the received segmented media packets 27a-27c and selectively stores them in memory 26. For example, as shown in FIG. 4B, since all requests 80a-80c were for the same media packets, the processor 28 stores only one of the received segmented media packets 27a in memory 26. The stored segmented media packets 27a can be, for example, the first media packets received or the media packets with the highest quality of service (QoS). Therefore, by requesting the same segment from multiple sources 70a-70c, the media player 20 can ensure a higher QoS for that segment than may be possible if requesting from only a single source.

Figure 4C:
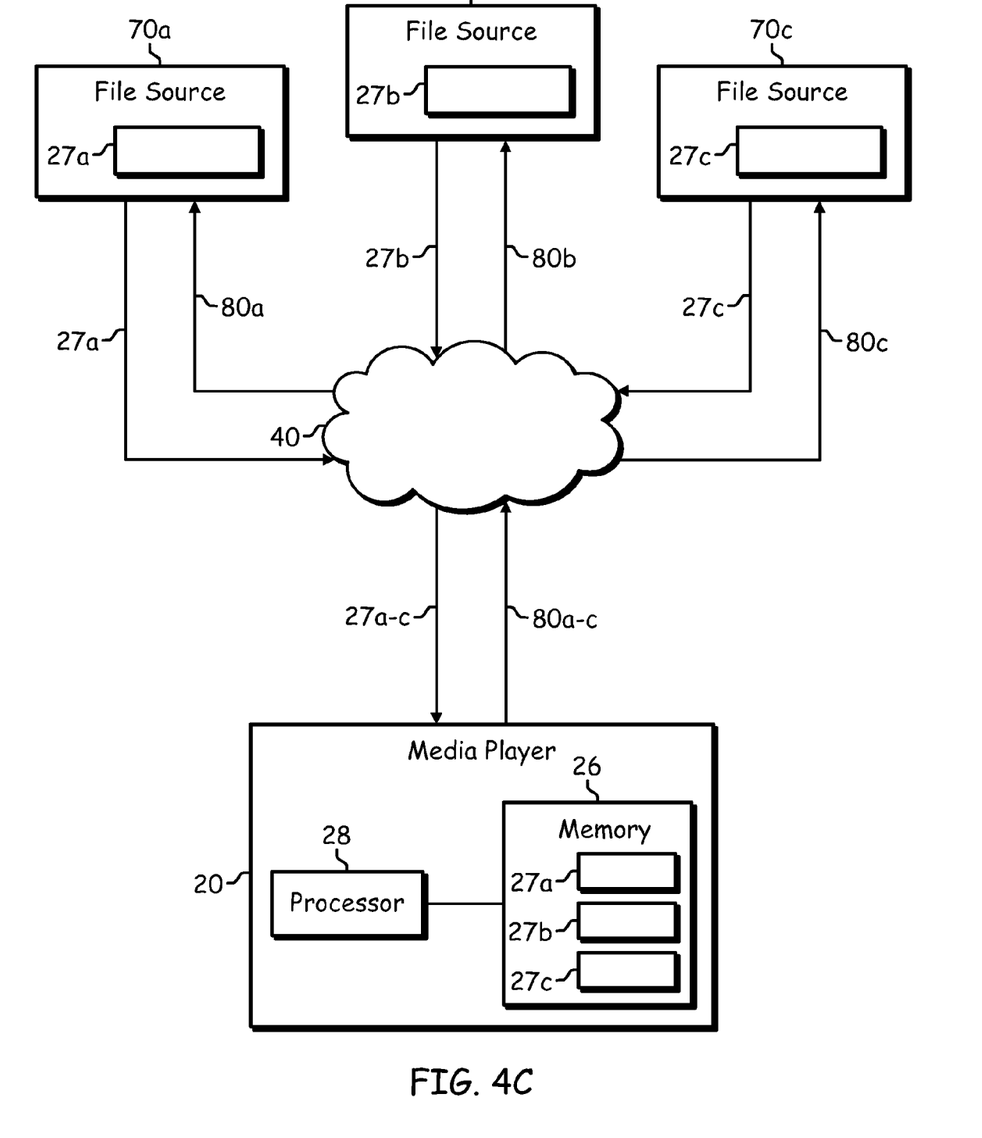

In another embodiment, as shown in FIG. 4C, the processor 28 can store all of the segmented media packets 27a-27c received from each of the media file sources 70a-70c within the memory 26. In this embodiment, if all received segmented media packets 27a-27c are the same media packets, the processor 28 can verify the integrity of the data within one of the received segmented media packets 27a using the other received segmented media packets 27b and 27c. For example, if the segmented media packets 27a from media file source 70a are received first, the processor 28 can use subsequently received media packets 27b and 27c from media file sources 70b and 70c to confirm the CRC (Cyclic Redundancy Check) code of the initially received segmented media packets 27a.

Figure 4D:
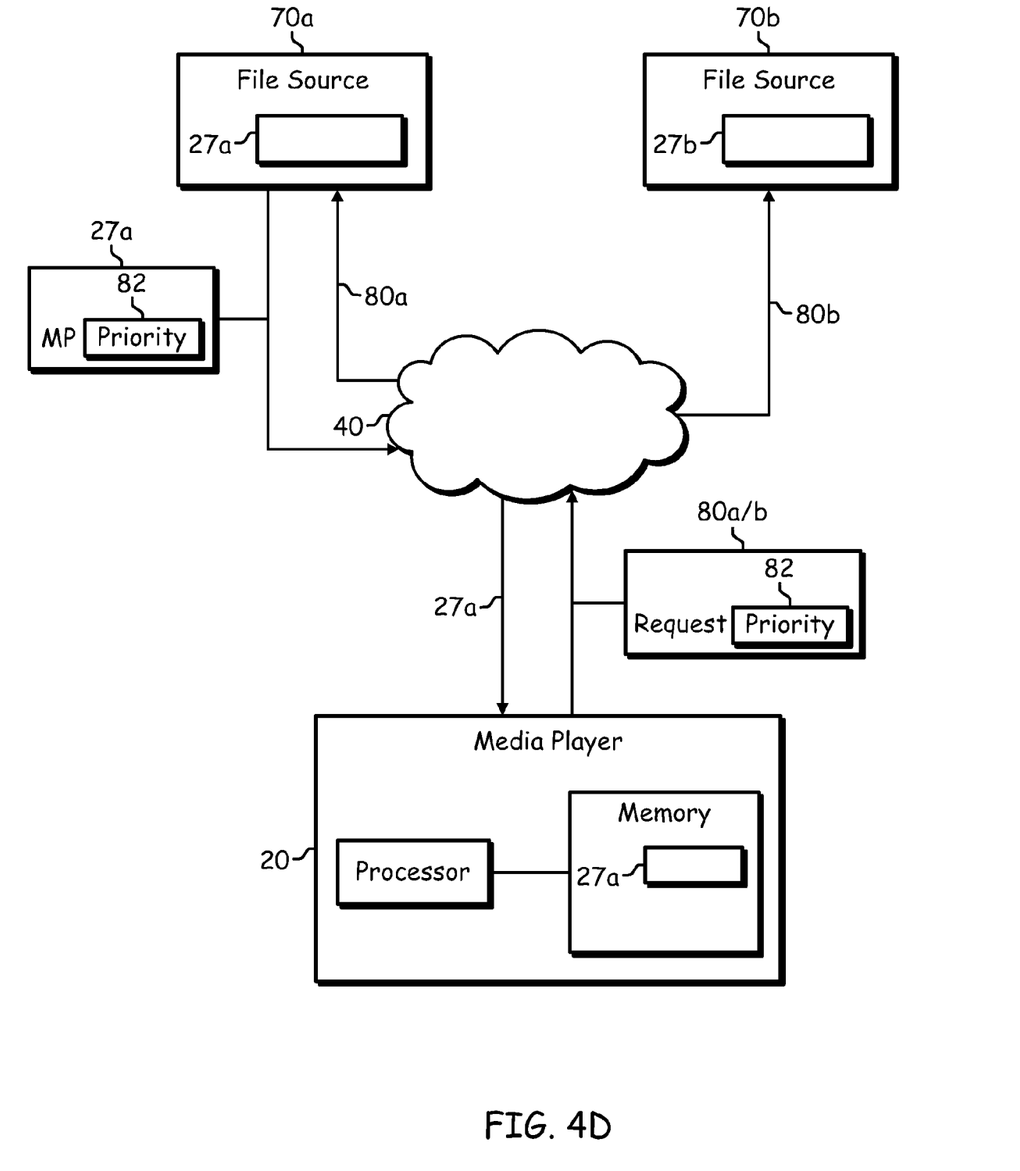

FIG. 4D illustrates an exemplary operation of the media player 20 to assign a priority 82 to a media packet request 80. In FIG. 4D, the media player generates and transmits requests 80a and 80b, each including priority 82, to media file sources 70a and 70b, respectively. In one embodiment, the priority 82 can be used by the network 40 to transport the requests 80a and 80b to the media file sources 70a and 70b. In another embodiment, the priority 82 can be used at the media file sources 70a and 70b to process the requests 80a and 80b and/or ensure a more reliable delivery of the requested segmented media packets 27 from the media file sources 70a and 70b. For example, in an exemplary embodiment, as shown in FIG. 4D, the priority 82 indicates a particular transmission priority 82 (i.e., a quality of service) for the requested segmented media packets 27a.

In an exemplary operation, as shown in FIG. 4D, upon receipt of the request 80a and priority 82 at media file source 70a, the media file source 70a initiates transmission of the requested segmented media packets 27a towards the media player 20 with a particular quality of service (QoS). The QoS is used by the network 40 to ensure a reliable and timely delivery of the requested segmented media packets 27a to the media player 20. If the requested QoS cannot be provided by one of the media file sources, e.g., media file source 70b, the request 80b may not be processed.

Figure 5:
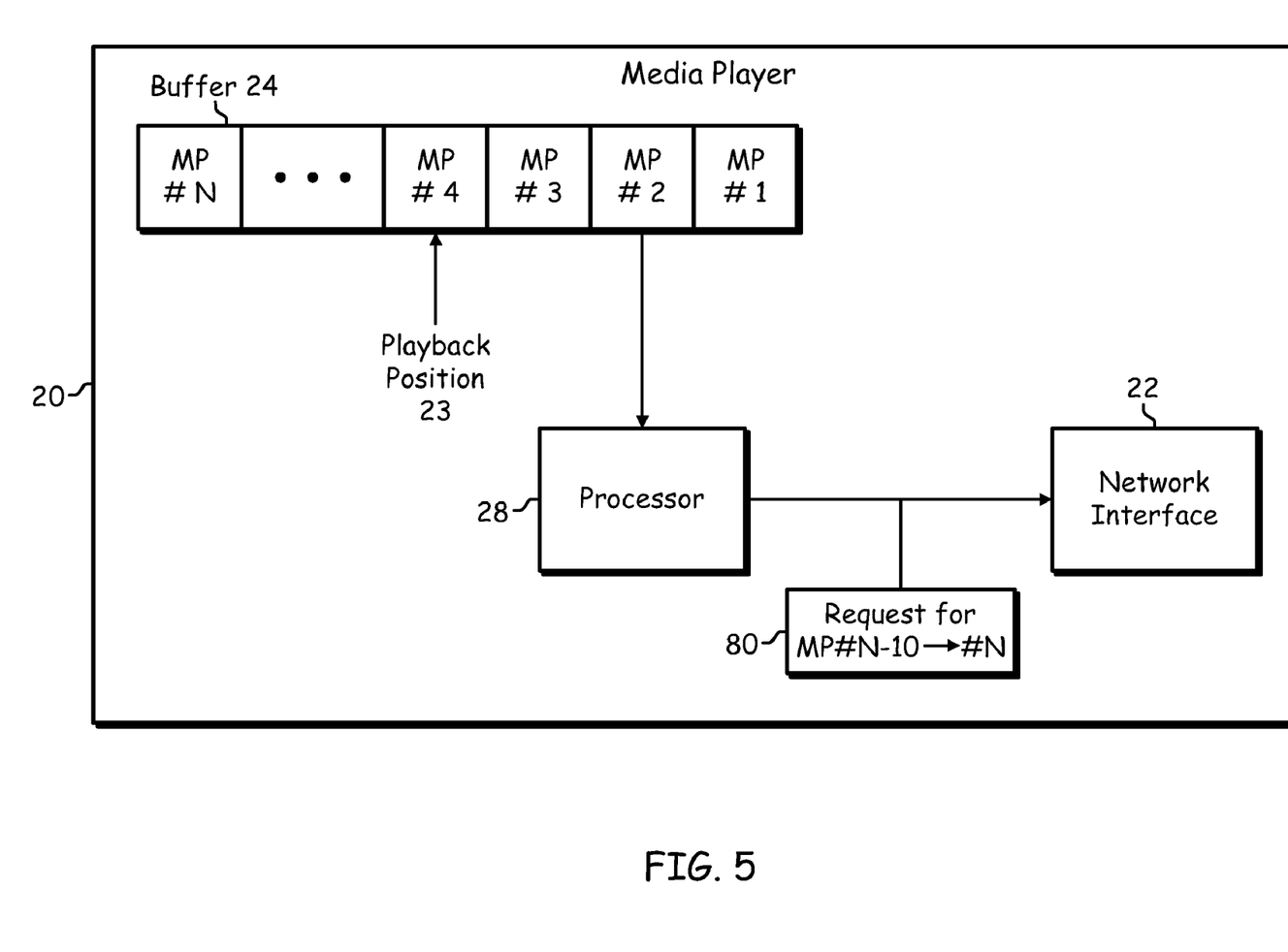
FIG. 5 is a schematic block diagram illustrating an exemplary operation of the media player to generate a request for segmented media packets in accordance with the present invention.

FIG. 5 is a schematic block diagram illustrating an exemplary operation of the media player 20 to generate a request 80 for segmented media packets in accordance with the present invention. In FIG. 5, the request 80 is generated by the processor 28 based on the current playback position 23 within the buffer 24. For example, the current playback position 23 is pointing to media packet #4 within the buffer 24. The processor 28, with knowledge of the current playback position 23, determines which media packets of the media file to request from additional media file sources. The requested segmented media packets can be outside of the buffer or within the buffer

24. In FIG. 5, the requested segmented media packets are at the end of the buffer 24 (i.e., media packet #N-10 through media packet #N). The request 80 is transmitted to at least one segmented media file source via network interface 22.

In addition, as described above, the request 80 can indicate a particular priority for the media packets. In one embodiment, the priority can be determined based on the playback position 23 in the buffer 24. For example, requested segmented media packets towards the end of the buffer 24 can have a lower priority than requested segmented media packets towards the beginning of the buffer 24. Different priorities can be used based on the playback position 23 and buffer time. The priority can also dynamically change based on the current playback position 23 in the buffer 24 and/or the number or identity of segmented media packets already received. For example, multiple requests 80 for the same segmented media packets can be sent sequentially, each with a different priority depending on the playback position and/or which segmented media packets have already been received.

Figure 6:
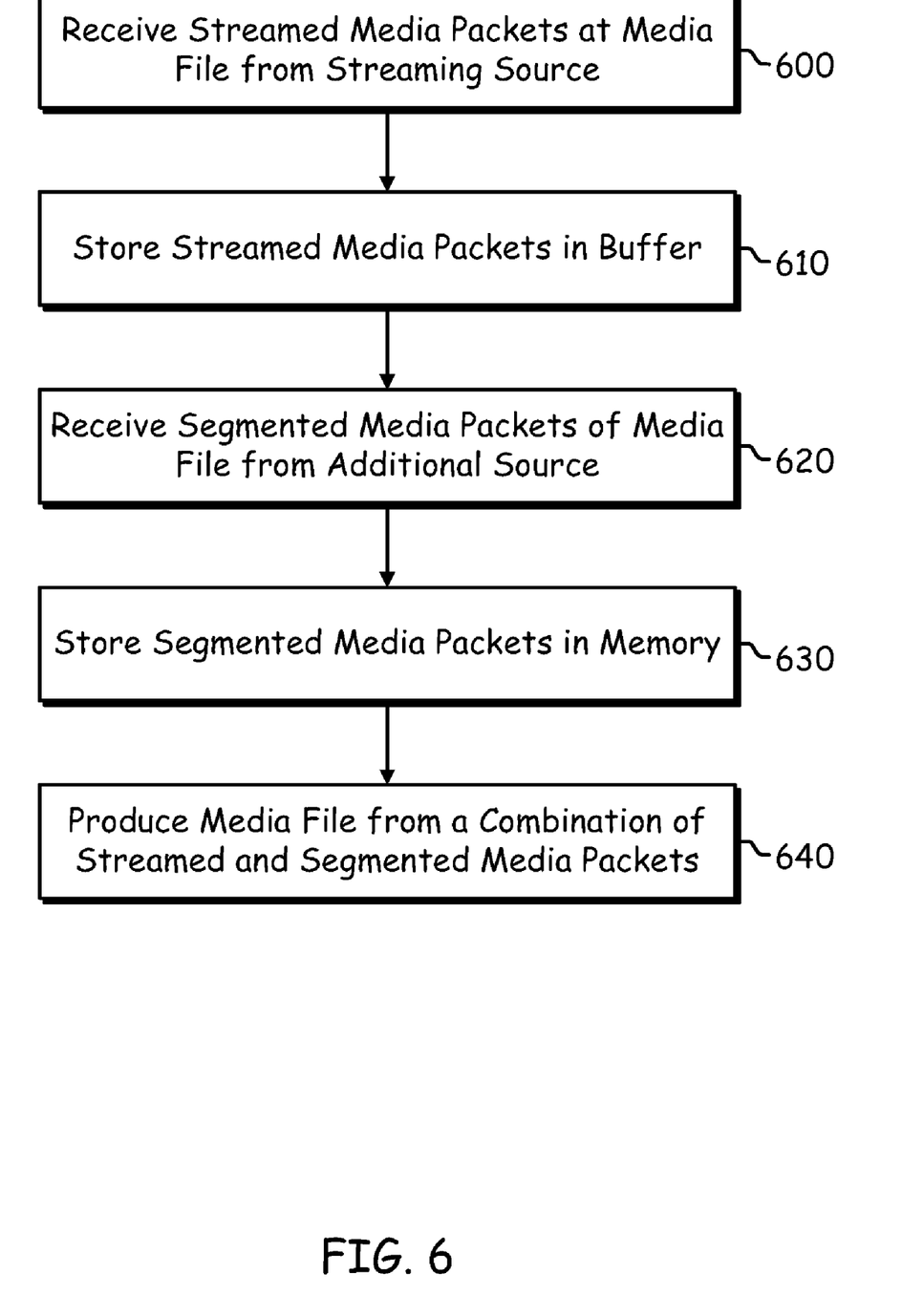
FIG. 6 is a logic diagram of an exemplary process for producing a media file using parallel download streamed and segmented media file sources in accordance with the present invention.

FIG. 6 is a logic diagram of an exemplary process for producing a media file using parallel download streamed and segmented media file sources in accordance with the present invention. Initially, at step 600, streamed media packets of the media file are received in sequential packet number order from a first source. At step 610, the streamed media packets are stored in a buffer. In addition, at steps 620 and 630, segmented media packets of the media file are received in random order from a second source and stored in a memory. Finally, at step 640, the media file is produced from a combination of the streamed media packets in the buffer and the segmented media packets in the memory.

As may be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has further been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A media player, comprising:
a network interface coupled to an Internet Protocol (IP) network to receive a media file from at least two sources, a first source streaming delivery of streamed media packets of the media file in sequential packet number order and a second source providing segmented delivery of segmented media packets of the media file in random order;
a buffer coupled to the network interface to receive and store the streamed media packets;
a memory coupled to the network interface to receive and store the segmented media packets; and
a processor operable to retrieve the streamed media packets from the buffer and the segmented media packets from the memory and to combine the streamed media packets and the segmented media packets to produce the media file;
wherein the media file streamed by the first source is the same as the media file provided by the second source.

2. The media player of claim 1, wherein the processor is further operable to retrieve the streamed media packets corresponding to a first portion of the media file from the buffer and the segmented media packets corresponding to a second portion of the media file from the memory.

3. The media player of claim 2, wherein the first portion corresponds to one of a beginning of the media file or an ending of the media file.

4. The media player of claim 1, wherein the processor is further operable to identify missing media packets from the segmented media packets and to use the streamed media packets corresponding to the missing media packets to produce the media file.

5. The media player of claim 1, wherein the processor is further operable to request the segmented media packets from the second source.

6. The media player of claim 5, wherein the processor is further operable to indicate a priority for a portion of the media file from the second source.

7. The media player of claim 6, wherein the priority specifies a quality of service for the portion of the media file.

8. The media player of claim 7, wherein the processor is further operable to request the portion of the media file from multiple secondary sources and the quality of service is determined by the number of multiple secondary sources.

9. The media player of claim 8, wherein the processor is further operable to use the segmented media packets received from one of the multiple secondary sources and discard the segmented media packets received from others of the multiple secondary sources.

10. The media player of claim 8, wherein the processor is further operable to verify the integrity of data contained within the segmented media packets received from an initial one of the multiple secondary sources using the segmented media packets received from at least one subsequent one of the multiple secondary sources.

11. The media player of claim 6, wherein the processor is further operable to indicate different priorities for different portions of the media file.

12. The media player of claim 6, wherein the portion of the media file associated with the priority includes the segmented media packets corresponding to a section of the streamed media packets not yet received.

13. The media player of claim 12, wherein the section of the streamed media packets include a group of media packets immediately outside of the buffer.

14. The media player of claim 12, wherein the section of the streamed media packets dynamically varies over time.

15. The media player of claim 6, wherein the portion of the media file associated with the priority is determined based upon a playback position within the buffer.

16. A method for producing a media file for display using parallel download streamed and segmented media file sources, comprising:
   receiving streamed media packets of the media file in sequential packet number order from a first source;
   storing the streamed media packets in a buffer;
   receiving segmented media packets of the media file in random order from a second source;
   storing the segmented media packets in a memory; and
   producing the media file from a combination of the streamed media packets in the buffer and the segmented media packets in the memory;
   wherein the media file streamed from the first source is the same as the media file provided by the second source.

17. The method of claim 16, wherein the producing the media file further includes:
   retrieving the streamed media packets corresponding to a first portion of the media file from the buffer; and
   retrieving the segmented media packets corresponding to a second portion of the media file from the memory.

18. The method of claim 16, wherein the producing the media file further includes:
   identifying missing media packets from the segmented media packets; and
   using the streamed media packets corresponding to the missing media packets to produce the media file.

19. The method of claim 16, further comprising:
   requesting the segmented media packets from the second source.

20. The method of claim 19, wherein the requesting the segmented media packets further includes:
   indicating a priority for a portion of the media file from the second source.

* * * * *